United States Patent
Ybarra et al.

(10) Patent No.: US 7,437,245 B2
(45) Date of Patent: Oct. 14, 2008

(54) THREAT AVOIDANCE SYSTEM AND METHODS USING ADJUSTMENTS TO BUILT-IN VALUES

(75) Inventors: Kathryn W Ybarra, Surprise, AZ (US); Zachary R. Reynolds, Peoria, AZ (US)

(73) Assignee: Aviation Communication & Surveillance Systems, LLC, Pheonix, AZ (US)

( * ) Notice: Subject to any disclaimer, the term of this patent is extended or adjusted under 35 U.S.C. 154(b) by 0 days.

(21) Appl. No.: 11/706,637

(22) Filed: Feb. 12, 2007

(65) Prior Publication Data

US 2007/0198143 A1 Aug. 23, 2007

Related U.S. Application Data

(63) Continuation of application No. 10/263,993, filed on Oct. 3, 2002, now abandoned.

(51) Int. Cl.
G05D 1/00 (2006.01)
G08B 21/00 (2006.01)
G06F 17/00 (2006.01)

(52) U.S. Cl. ............... 701/301; 701/8; 701/213; 340/945; 342/29

(58) Field of Classification Search ........... 701/300, 701/301, 213, 3, 4, 8–10; 340/945, 988, 340/963; 342/109, 26, 29
See application file for complete search history.

(56) References Cited

U.S. PATENT DOCUMENTS

| | | | |
|---|---|---|---|
| 5,157,615 A * | 10/1992 | Brodegard et al. | 701/301 |
| 5,488,563 A | 1/1996 | Chazell et al. | |
| 5,638,282 A | 6/1997 | Chazell et al. | |
| 5,820,080 A | 10/1998 | Eschenbach | |
| 5,999,990 A | 12/1999 | Sharrit et al. | |
| 6,021,374 A * | 2/2000 | Wood | 701/301 |
| 6,041,035 A | 3/2000 | Thedens | |
| 6,072,994 A | 6/2000 | Phillips et al. | |
| 6,115,656 A * | 9/2000 | Sudolsky | 701/35 |
| 6,289,277 B1 * | 9/2001 | Feyereisen et al. | 701/202 |
| 6,347,263 B1 | 2/2002 | Johnson et al. | |
| 7,131,136 B2 * | 10/2006 | Monroe | 725/105 |
| 2002/0010542 A1 * | 1/2002 | Ahrens et al. | 701/200 |
| 2002/0036574 A1 * | 3/2002 | Ishihara | 340/945 |
| 2002/0109612 A1 * | 8/2002 | Simon et al. | 340/945 |
| 2003/0135327 A1 * | 7/2003 | Levine et al. | 701/220 |
| 2004/0068372 A1 | 4/2004 | Ybarra et al. | |

OTHER PUBLICATIONS

Honeywell International Inc., Product Specification for the MK XXII Helicopter Enhanced Ground Proximity Warning System (EGPWS), Dec. 12, 2000, p. 1-125.

* cited by examiner

Primary Examiner—Tan Q Nguyen
(74) Attorney, Agent, or Firm—Allen J. Moss; Squire, Sanders & Dempsey, L.L.P.

(57) ABSTRACT

A system for enhancing flight safety of a host aircraft receives an adjustment value from a portable memory device; determines a working value of a parameter in accordance with the adjustment value; and provides an advice for threat avoidance in accordance with the working value of the parameter, a terrain database, and an expected climb gradient capability of the host aircraft. The adjustment value may describe an adjustment to at least one of: an aircraft capability parameter, a flight crew capability parameter, a mission parameter, a threat detection technique parameter, a threat advice parameter, or a threat avoidance parameter. Threats include a risk of colliding with other aircraft, colliding with terrain, and encountering adverse weather conditions.

21 Claims, 5 Drawing Sheets

THREAT AVOIDANCE SYSTEM AND METHODS USING ADJUSTMENTS TO BUILT-IN VALUES

CROSS REFERENCE TO RELATED APPLICATION

This application is a continuation of and claims priority to U.S. patent application Ser. No. 10/263,993, filed Oct. 3, 2002 now abandoned by Ybarra et al., the disclosure of which is incorporated herein by reference in its entirety.

FIELD OF THE INVENTION

Embodiments of the present invention relate to flight safety and to threat avoidance systems in aircraft.

BACKGROUND OF THE INVENTION

A conventional threat avoidance system installed in a host aircraft provides advice (e.g., advisories and/or alerts) to members of the flight crew so as to reduce the risk of colliding with other aircraft, colliding with terrain, or encountering adverse weather conditions. Advice is based on detecting aspects of the host aircraft, other aircraft, and/or weather conditions; predicting future positional relationships among the host aircraft, other aircraft, terrain as described in elevation maps, and/or weather conditions; and predicting the capability of the flight crew and the host aircraft to respond to the advice. Inaccuracies in detecting these aspects and inaccuracies in models of behaviors used for predictions have led to the use of numerical safe guards that result in inaccurate advice including what is colloquially referred to as "nuisance" advice.

Efforts to reduce the occurrence of nuisance advice have focused on reducing uncertainty in detecting aspects such as determining more accurate host aircraft altitude. Other uncertainties may be more significant, such as uncertainties in modeling host aircraft performance. Another approach adjusts the behavioral model of the host aircraft according to measured performance of the host aircraft during take-off. This too is unsatisfactory due to differences between a take-off scenario and a threat avoidance scenario. For example, one cannot assume that take-off will be attempted at full throttle or maximum climb angle as may be used to avoid collision. Knowledge of host aircraft performance at one throttle setting and climb angle may not be sufficient to reduce uncertainty in predicting performance at other throttle settings and climb angles. Knowledge of flight crew responsiveness during take-off may not be sufficient to reduce uncertainty in predicting responsiveness in reacting to advice.

It is highly desirable to reduce nuisance advice without compromising flight safety. A departure from the prior art is needed to further reduce nuisance advice. Without systems and methods of the present invention, nuisance advice will remain at undesirable levels, possibly contributing to distracting conditions for the flight crew or a tendency to ignore recurring advice which may result in loss of life and damage to property when a collision is not successfully avoided.

SUMMARY OF THE INVENTION

A system, according to various aspects of the present invention, installed on a host aircraft for enhancing flight safety of the host aircraft, includes a module for receiving an adjustment value from a portable memory device, a module for determining a working value of a parameter in accordance with the adjustment value, the parameter describing other than terrain and expected climb gradient; and a module for threat avoidance that provides an advice in accordance with the working value of the parameter, a terrain database, and an expected climb gradient capability of the host aircraft. The modules may be packaged in a line replaceable unit.

In another implementation, a system, according to various aspects of the present invention, installed on a host aircraft for enhancing flight safety of the host aircraft, includes: a module for receiving an adjustment value from a portable memory device; a module for determining a working value of a parameter in accordance with the adjustment value, the parameter describing other than expected climb gradient; and a module for traffic collision avoidance that provides an advice in accordance with the working value of the parameter and an expected climb gradient capability of the host aircraft.

A method, according to various aspects of the present invention, for enhancing flight safety of an aircraft, includes in any order: (a) receiving an adjustment value from a portable memory device; (b) determining a working value of a parameter in accordance with the adjustment value, the parameter describing other than terrain and expected climb gradient; and (c) providing an advice for threat avoidance in accordance with the working value of the parameter, a terrain database, and an expected climb gradient capability of the host aircraft.

By providing an advice in accordance with the adjustment value, deployment of the subsystem for threat avoidance is facilitated into many different host aircraft and mission installations. Customization for each deployment may be accomplished with different adjustment values in different storage subsystems. For example, a portable memory device may be implemented with a memory card having a PCMCIA interface.

A threat avoidance processor for installation on a host aircraft, according to various aspects of the present invention, includes a subsystem for obtaining an adjustment value and a processor that performs the following functions in any order: (a) identifying a built-in value associated with the adjustment value; (b) determining a working value in accordance with at least one of the adjustment value, and a combination of the adjustment value and the built-in value; (c) determining host aircraft position, altitude, velocity, and bearing; (d) assessing a risk of encountering a threat (e.g., a collision) in accordance with the working value, the host aircraft position, altitude, velocity, and bearing; and (e) providing advice to reduce the risk of encountering the threat (e.g., avoiding a collision). For example, the working value may be used by a module of a threat avoidance processor to give effect to any of: an aircraft capability parameter, a flight crew capability parameter, a mission parameter, a threat detection technique parameter, a threat advice parameter, or a threat avoidance parameter.

By assessing a threat in accordance with a working value that is either copied from an adjustment value or calculated from an adjustment value, advice pertaining to avoiding the threat may be provided with less nuisance advice.

BRIEF DESCRIPTION OF THE DRAWING

Embodiments of the present invention will now be further described with reference to the drawing, wherein like designations denote like elements, and.

DETAILED DESCRIPTION OF THE PREFERRED EMBODIMENTS

Figure 1:
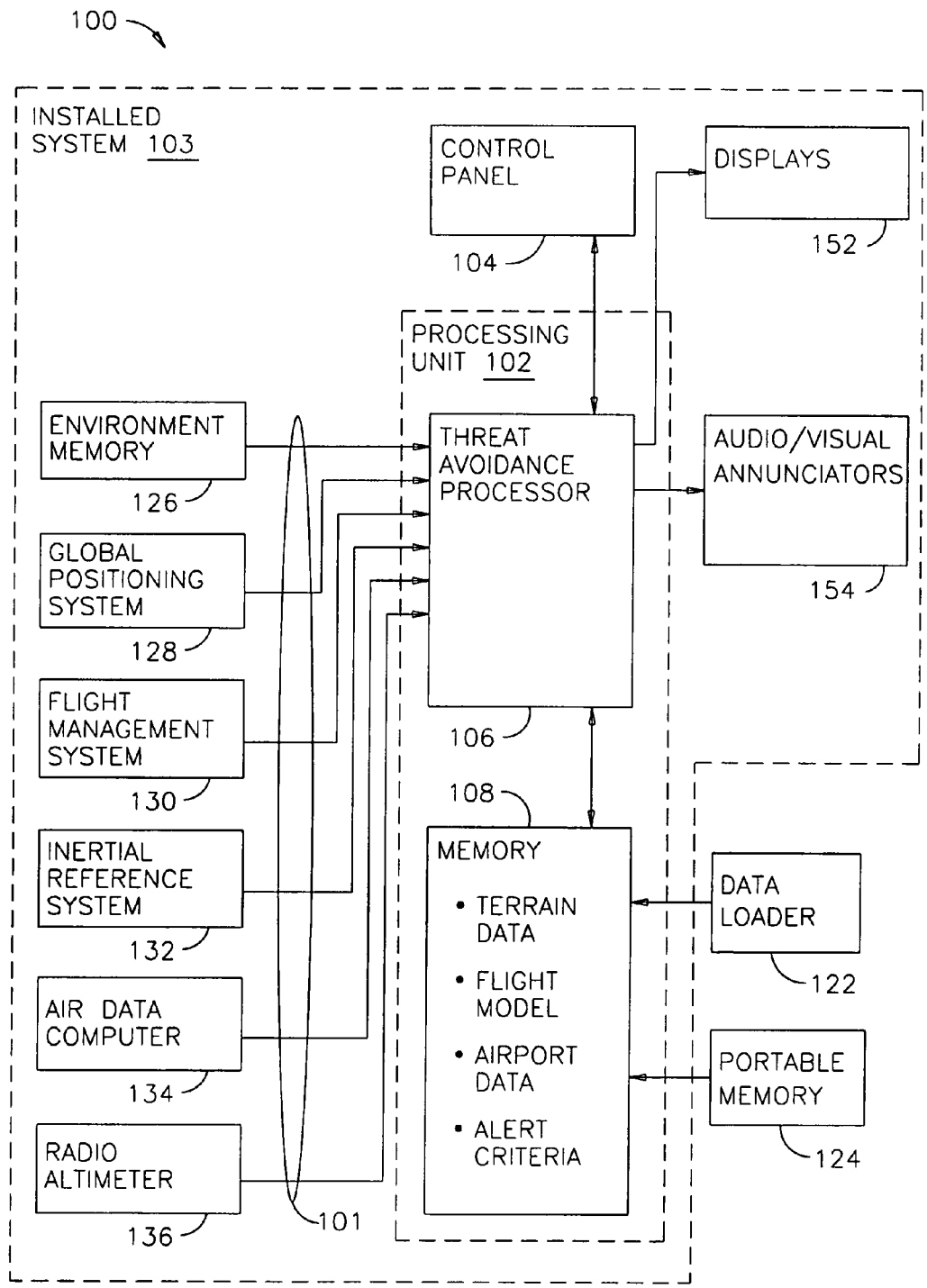
FIG. 1 is a functional block diagram of a threat avoidance system according to various aspects of the present invention.

A system for enhancing flight safety, according to various aspects of the present invention, provides advice to a flight crew member regarding a threat. Threats include, among other things, hazards such as a risk of colliding with traffic or terrain; and, a risk of encountering adverse weather conditions. Advice includes advisories and alerts both visual and auditory. Visual advice may be presented by symbols or colors of a graphic presentation for display to a flight crew member. Such a system may include any conventional system modified as described herein. Conventional systems include, for example, systems as specified in DO-185A (available from RTCA, Inc.) as to traffic collision avoidance; and, systems as specified in Advisory Circular AC 25-18, AC 25-23, or TSO-C151a (available from U.S. Dept. of Transportation or http://av-info.faa.gov) as to terrain avoidance. A system for enhancing flight safety may include threat avoidance detection and processing for any combination of types of threats (e.g., terrain, windshear, storm, traffic, and military threats). As used herein, the term threat avoidance means any action that enhances flight safety by reducing risk, for example, detecting a hazard or providing advice, regardless of whether hazards are entirely or completely avoided.

A system for enhancing flight safety, according to various aspects of the present invention, generally includes a threat avoidance processor for providing advice (e.g., traffic advisories, terrain alerts, and/or weather alerts). A threat avoidance processor includes any processor that accepts data for assessing a risk of encountering a threat (e.g., a risk of collision with traffic or terrain). A threat avoidance processor may obtain risk data in modules, the data for predicting or responding to risk. Each module may include software (e.g., executable code, parameters, values, and/or adjustments) used to establish a working parameter value for an aircraft capability parameter, a flight crew capability parameter, a mission parameter, a threat detection technique parameter, a threat advice parameter, or a threat avoidance parameter. During operation, the system may provide less nuisance advice than conventional systems. As used herein, the term threat detection technique parameter means any one or more criteria, sensors, or profiles used to determine the existence, location, and/or properties of a threat.

Nuisance advice includes a notice (e.g., an advisory, alert, warning, or caution) provided by a threat avoidance system in accordance with a risk assessment that differs from a pilot's risk assessment to such an extent that provision of the advice is distracting to the pilot. Risk assessment by the system is based on many sources having more or less uncertainty, including, for example, input data and measurements, assumptions of a risk avoidance strategy, and the logic of the strategy. Risk assessment by the pilot is based on many sources having more or less uncertainty including, for example, human perception, knowledge of the route taken, assumptions about aircraft responsiveness and capability, judgment, and response time. A system for enhancing flight safety, according to various aspects of the present invention, provides less nuisance advice at least in part by reducing the extent of difference between the basis for risk assessment used by the system and the basis for risk assessment used by the pilot.

For example, system 100 of FIG. 1 includes an installed system 103, a data loader 122, and a portable memory 124. Installed system 103 is generally installed in an aircraft (e.g., the host aircraft) as a collection of line replaceable units (LRUs) that are individually removed and replaced for maintenance and upgrade. By contrast, data loader 122 (e.g., a conventional data loader as per specification ARINC 615-4 or 615A-2 having a serial digital interface) is temporarily coupled from time to time to installed system 103 for the transfer of software for maintenance, configuration control, or upgrade. Further, portable memory 124 (e.g., a CompactFlash® card having a PCMCIA® digital parallel bus interface) is coupled from time to time to installed system 103 for purposes similar to data loader 122 and for data collection from system 103. COMPACTFLASH is a trademark of the CompactFlash Association. PCMCIA is a trademark of the Personal Computer Memory Card International Association. Generally, normal operation of system 100 for enhancing flight safety is accomplished without either data loader 122 or portable memory 124 coupled to installed system 103. In other words, data transfer to and from data loader 122 and portable memory 124 is generally associated with pre-flight, standby, and post-flight modes of operation. However, portable memory may be used during flight as desired (e.g., for the flexibility to change missions during flight).

Installed system 103 includes processing unit 102, control panel 104, environment memory 126, global positioning system 128, flight management system 130, inertial reference system 132, air data computer 134, radio altimeter 136, displays 152, and audio annunciators 154. In one implementation, each of items 104, 128, 130, 132, 134, 136, 152, and 154 is packaged as an LRU using conventional structures, circuits, software, and techniques.

Processing unit 102 includes a threat avoidance processor 106 and a memory 108. A threat avoidance processor may include any computer circuit and software (e.g., firmware) for providing advice as discussed above. Memory 108 includes any conventional memory circuits, apparatus, and media (e.g. semiconductor, magnetic, optical, solid state, tape, or disk). Memory 108 provides storage for software that is built-in, working values (e.g., values for parameters, arguments, and variables), and software received from data loader 122, portable memory 124, and/or environment memory 126. Software includes executable programs and data. Functions of processing unit 102 are performed by modules (e.g., circuitry of processor 106 and/or software from memory 108). Executable programs include an operating system, input/output modules, and application programs. Software to perform threat avoidance functions may include one or more application programs.

An application program may be initialized by the operating system and/or other application programs. Initialization includes establishing any values (e.g., default values and initial values) for normal operation. For example, when memory 108 includes read only memory for default and initial values, and read/write memory for working values, initialization may copy a default or initial value stored in read only memory (e.g., from a file system on disk storage) to a corresponding working value stored in working memory (e.g., high speed semiconductor memory).

In operation, system 100 provides advice as to threats of collision with terrain. Memory 108 may provide processor 106 with built-in data and data loaded as desired from data loader 122 and portable memory 124. Data (whether built-in or loaded) may include terrain data, flight models, airport data, and alert criteria. Working values for any of these data may be affected by adjustment values read from environment memory 126, portable memory 124, or data loader 122. Terrain data generally includes descriptions of the elevation (or maximum elevation) of points (or regions) over which the host aircraft is expected to travel. Terrain data may be organized as a map (or data structure representation of a map) for simplifying the preparation of graphic presentations. Flight models generally include host aircraft performance characteristics (e.g., minimum and maximum responses and responsiveness to any cockpit controls) and may be organized according to various bands of altitude, pressure, weight of fuel, total aircraft weight, and any environmental characteristic (e.g., head wind speed, outside temperature). Airport data generally includes terrain data associated with an airport and descriptions of approaches and run ways into airports the host aircraft is expected to have access to during the mission.

Figure 4:
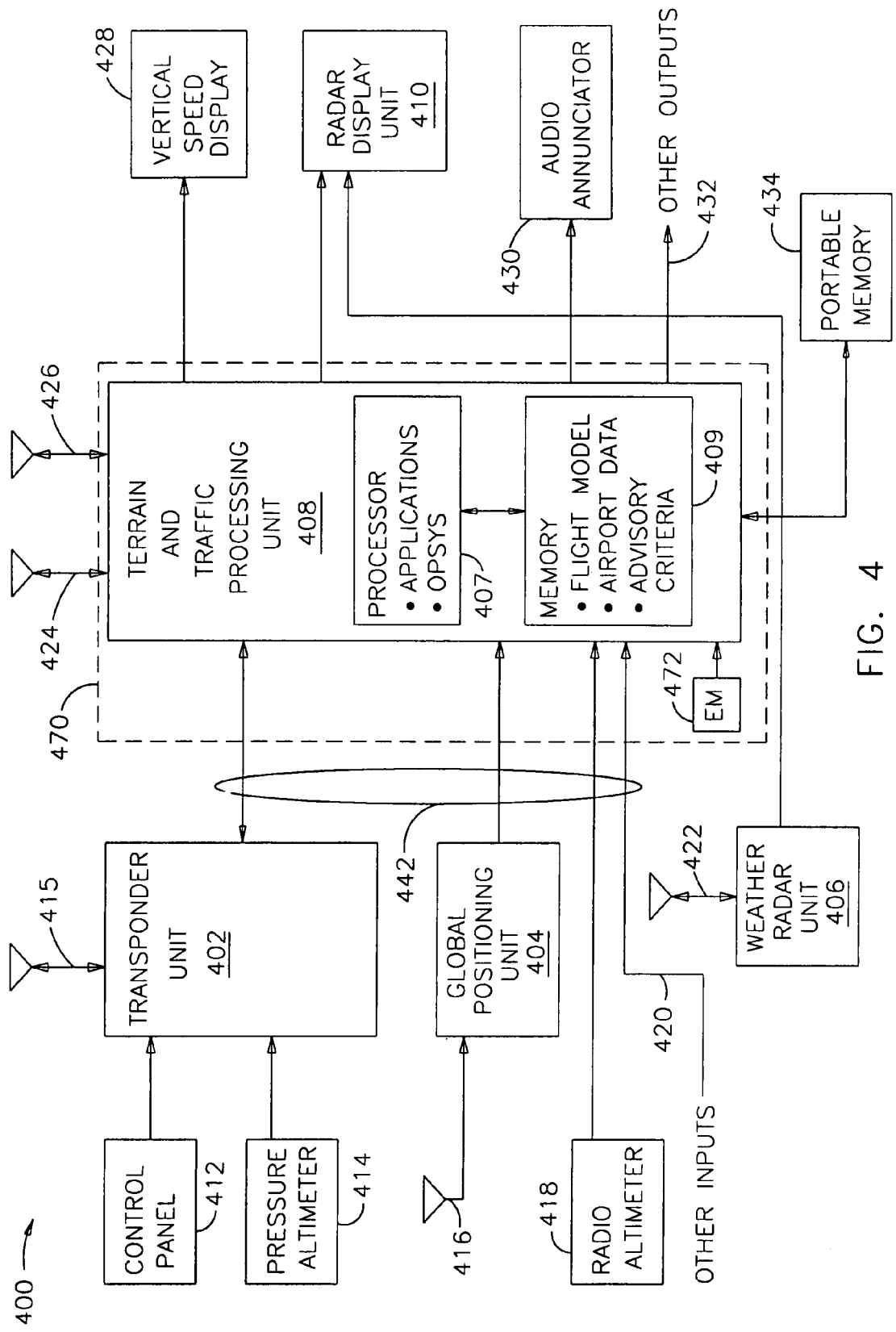
FIG. 4 is a functional block diagram of another threat avoidance system according to various aspects of the present invention.

In system 100, threat processor 106 receives signals 101 from items 128-136; and provides advice via signals to displays 152 and audio annunciators 154. In alternate systems for enhancing flight safety, according to various aspects of the present invention, other input signal sources and other signals are used in place of signals 101. For example, system 400 of FIG. 4 includes transponder control panel 412, pressure altimeter 414, transponder unit 402, global positioning unit 404, terrain and traffic processing unit 408, radio altimeter 418, weather radar unit 406, vertical speed display 428, radar display unit 410, and audio annunciator 430, portable memory 434, and environment memory 472. Conventional radio signals are suitably transmitted and received via conventional antenna 416 coupled to GPS unit 404, antenna 415 coupled to transponder 402, antenna 422 coupled to weather radar 406, and antennas 424 (directional) and 426 (omnidirectional) coupled to processing unit 408.

Inputs 442 including other inputs 420 (e.g., from systems such as items 130-134 of FIG. 1) are analogous to inputs 101 of system 100. Conventional traffic advisories and terrain alerts are provided by system 400 via outputs from processing unit 408 to items 428, 410, 430 and other outputs 432 (e.g., to a flight data recorder).

Terrain and traffic processing unit 408 includes threat avoidance processor 407 coupled to memory 409. Memory 409 provides storage for software that is built-in, working values (e.g., values for parameters, arguments, and variables), and software received from a conventional data loader (not shown), portable memory 434, and/or environment memory 472. Software includes executable programs and data. Threat avoidance processor 407 includes modules as discussed above for performing threat avoidance. Processor 407 typically includes processing circuitry for performing software recalled from memory 409. Executable programs include an operating system, input/output modules, and application programs. Software to perform terrain and traffic avoidance functions may include one or more application programs cooperating in a multitasking environment. In alternate implementations, processing unit 408 implements threat avoidance functions (e.g., terrain and traffic collision avoidance) via any number of modules (e.g., any number of processors 407 and memories 409).

Terrain and traffic processing unit is implemented as an LRU installed in tray 470. Tray 470 provides mechanical stability and electrical connections to other subsystems of system 400. In particular, tray 470 includes environment memory 472 used generally for data describing host aircraft performance and data describing system 400 that are characteristic of this installation and implementation of system 400.

An environment memory includes any memory device (e.g., electronic, magnetic, optical, rotating media, or solid state) that stores data used to define, establish, or modify a configuration of a subsystem for use by an application program performed by the subsystem. Environment memory 126 (472) is coupled to processing unit 102 (408) for reading software from environment memory. According to various aspects of the present invention, processing unit 102 (408) receives data from environment memory 126 (472) to accomplish configuration of processing unit 102 (408) and to assure proper operation (e.g., certifiable or certified) of system 100 (400). Data in environment memory 126 (472) may be stored in any manner convenient for read or write access, for example, in modules arranged contiguously. Data includes modules, components, discrete ranges, and discrete values. Modules may include components, discrete ranges, and discrete values. Data may provide, describe, or limit system functions, provide parameters used to determine system performance, identify or describe subsystems (e.g., LRU type, version or configuration of features), or describe communication, cooperation, coordination, or priority among subsystems.

A subsystem (e.g., 102, 408) having internal nonvolatile memory (108, 409) may determine that environment memory should be read into the internal nonvolatile memory by comparing a signature of the internal nonvolatile memory with a signature of the environment memory. The signatures calculated and compared may be image-level, module-level, and/or component-level. Reading environment memory into internal nonvolatile memory may be avoided when corresponding calculated and read signatures match. In one implementation, environment memory 105 includes one module having an overall signature. The module comprises numerous components, each component comprising a respective signature. Preferably, each signature includes a value of the type known as a cyclic redundancy code. For each component, identification and validation of the component are simplified by maintaining a physical relationship between the component and its signature. The relationship may be between the signature and the component data. For example, storing the component's data contiguous with a header that includes the signature maintains a physical relationship between the signature and the data of the component. The relationship may be between the signature and a combination of the component data and header information, for example, calculating the signature on the basis of the component data and associated header information maintains a relationship between the header information and the component data.

A module may include data structures (e.g., any mix of discrete data, contiguous storage of data conforming to a format, a record or records, a frame or frames, a page or pages, a linked list, an array, or a string) each with or without signatures. Because a data structure may include other data structures, the entire environment memory contents, and any mix of one or more components and/or modules may be implemented as a data structure. Modules may include components that describe the versions, capabilities, and interfaces between subsystem 102 (408) and other portions of system 100 (400).

The contents of environment memory may be loaded prior to system installation (e.g., read only memory), or may be updated (e.g., any nonvolatile memory) by transferring data from a subsystem to the environment memory. A threat processor may represent a subsystem. For example, subsystem 102 (408) includes memory 108 (409) that may store a working copy of data read from environment memory. Software from either portable memory or from internal memory may be transferred to update environment memory 126 (472). The arrangement of data in internal nonvolatile memory may include modules, components, discrete ranges, and discrete values as discussed with reference to environment memory 126 (472). The arrangement of data in portable memory 124 (434) may include modules, components, discrete ranges, and discrete values as discussed with reference to environment memory.

In operation, system 100 (400) performs as follows. During initialization, processor 102 (408) may conditionally read environment memory 126 (472) as discussed above and operate in accordance with software read from the environment memory. System 100 (400) then continuously determines own aircraft data including altitude, velocity, and bearing; displays own aircraft data including altitude, velocity, and bearing; determines own aircraft position; displays a terrain map for the own aircraft position; assesses the risk of collision with terrain, or encountering adverse weather conditions; provides alerts to the flight crew corresponding to the risks; and may provide advice regarding strategies for reducing risk or avoiding known risks (e.g. corresponding to resolution adversaries). System 400 further continuously interrogates other aircraft to determine other aircraft altitude, velocity, and bearing; determines whether a threat of collision with other aircraft exists with reference to own aircraft altitude, velocity, and bearing and with other aircraft altitude, velocity, and bearing; displays in addition at least the altitude and bearing of other aircraft; asses the risk of collision with other aircraft; provides advisories to the flight crew corresponding to the risks; and may provide advisories regarding strategies for reducing risk or avoiding known risks (e.g. resolution adversaries).

A method, according to various aspects of the present invention, determines a set of working values for a processor or processing unit. Working values may be established in a hierarchical manner, for example, by applying one or more adjustments to a default or base value. The first adjustment may be applied by replacing the base value or by forming an intermediate value as a result of a combination of the base value and the adjustment value. Each subsequent adjustment (if any) may be applied in turn: (a) by replacing the intermediate value; or (b) by combining one or more intermediate values with the particular adjustment value. A combination may be any arithmetic operation or formula. For example, an adjustment may be a factor combined by multiplying the adjustment value to the base (or intermediate) value to produce a product as an intermediate (or final) working value. Alternatively, an adjustment may be an offset combined by adding (or subtracting) the adjustment value to (or from) the base (or intermediate) value to produce a sum (or difference) as an intermediate (or final) working value. In another implementation, a set of base values are adjusted according to a set of filter parameters to provide a working set of values shaped for a desired effect produced by a filter algorithm tailored by the filter parameters. For example, a set of terrain data may be smoothed and elevated to account for accumulated snow and ice or revised to reflect recent clearing by wild fire or road building.

Figure 2:
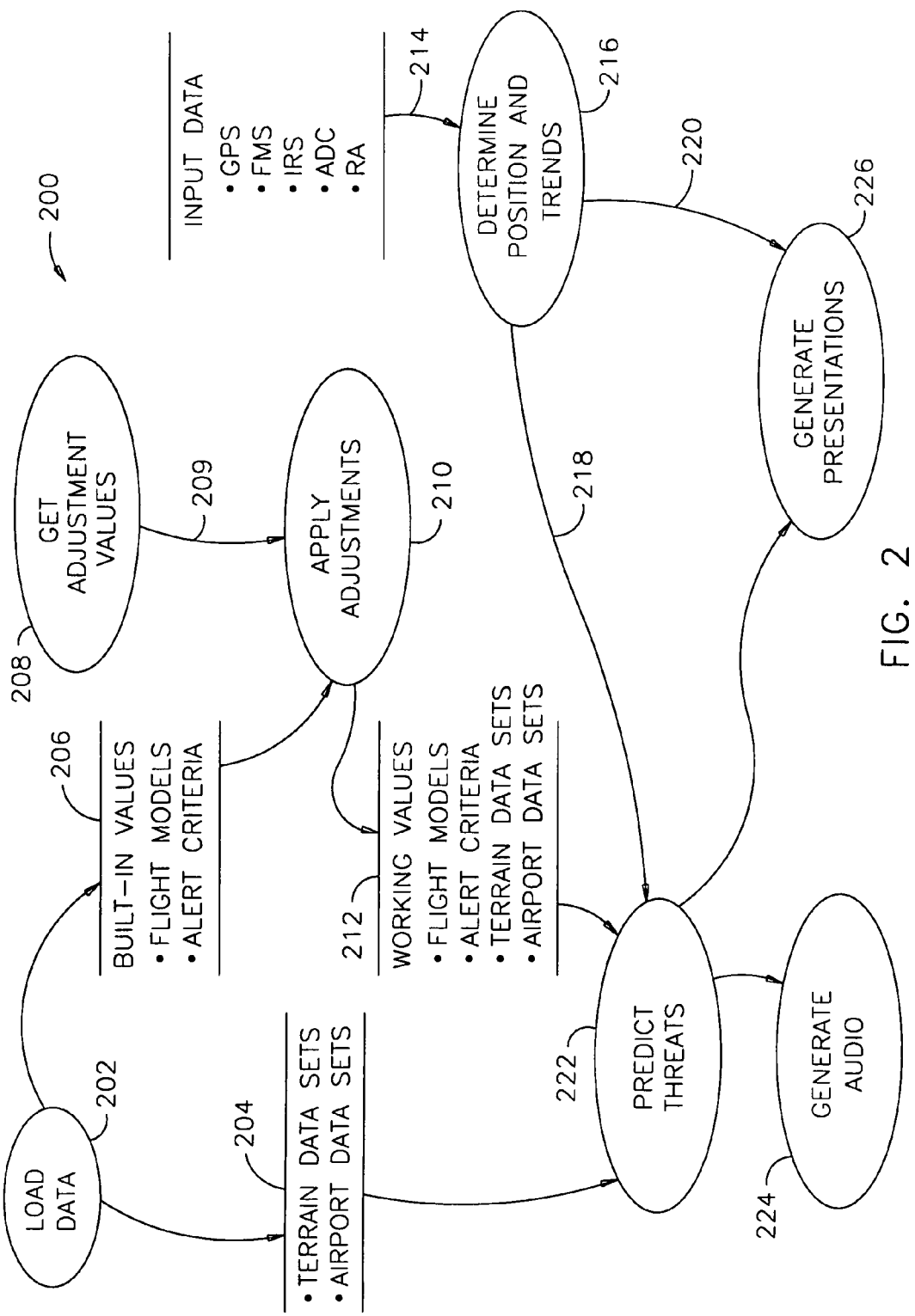
FIG. 2 is a data flow diagram of a process performed by the threat avoidance processor system of FIG. 1.

For example, a method for determining working values, according to various aspects of the present invention is performed by any threat avoidance processor. The following discussion with reference to threat avoidance processor 106 is equally applicable by analogy to terrain and traffic collision avoidance processor 408 or any processor for some or all of the threats discussed above. Method 200 of FIG. 2 is performed by processor 106 and includes load data process 202, get adjustment values process 208, apply adjustments process 210, determine position and trends process 216, predict threats process 222, generate audio process 224, and generate presentations process 226. These process may cooperate in any suitable conventional programming environment (e.g., a multitasking, multithreaded, operating environment) to effectively operate in parallel whenever input data for a particular process is available.

In one implementation, load data process 202 operates once per mission to accept data from data loader 122, portable memory 124, and/or environment memory 126. In an alternate implementation, load data process 202 operates when new media is available in data loader 122 or portable memory 124. In yet another implementation, process 202 operates when signaled by control panel 104 in response to exiting a power off or a standby mode of processing unit 102; or, as directed manually by an operator of control panel 104. Because environment memory 126 and processing unit 102 are both part of installed system 103, load data process 202 may load data from environment memory in response to application of primary power to processing unit 102.

Load data process 202 provides all or any portion of terrain data sets 204 and built-in values 206 (stored in memory 108). For example, an initial set of terrain data may be the result of transferring data from data loader 122 followed by additional data from portable memory 124. Built-in values may include an initial set of flight models and/or alert criteria stored in nonvolatile memory of memory 108 (if any) and supplemented by additional data from environment memory 126, portable memory 124, and/or data loader 122 for a particular mission of the host aircraft.

Get adjustment values process 208 may obtain configuration values from any of data loader 122, portable memory 124, and/or environment memory 126 at any suitable time, for example, following any operation of load data process 202. Each adjustment value is associated with indicia identifying a working value to which it applies. The association may be explicit (e.g., a value that is paired with an address or suitable reference into memory 108) or implied (e.g., values following an explicit value may be understood to be associated with consecutively following addresses or references into memory 108).

Get adjustment values process 208 distinguishes loadable values intended as built-in (e.g., base) values from adjustment values in any conventional manner. An inference may be sufficient distinction based on identification of the source of the data. For example, when data in environment memory 126 (or media accessed by data loader 122 or portable memory 124) is stored in components each having a header, a value in particular headers may distinguish the contents of the components as built-in values as opposed to adjustment values. In an alternate implementation, an inference is drawn from the identification of the media accessed by data loader 122 or portable memory 124. In yet another implementation, an inference is drawn from the source, for example, all media from data loader 122 is considered built-in values and all data from portable memory 124 is considered adjustment values.

Apply adjustments process 210 establishes working values 212, stored in memory 108, and typically including flight models, alert criteria, and terrain data customized for a particular mission or set of missions. Apply adjustments process 210 may respond to operation of load data process 202 by copying all or any portion of built-in values 206 into working values 212. Apply adjustments process 210 may in addition or alternatively operate when provided with unapplied adjustment values from process 208. Process 210 may calculate intermediate and final values for working values as discussed above.

An adjustment value may identify which of a set of working values is to be considered enabled to the exclusion of other members of the set. For example, by applying an adjustment, one flight model out of a set of flight models is enabled for use by predict threats process 222. By analogy, alert criteria and terrain data may be selected from respective sets of alert criteria and terrain data. Such selection may be accomplished during a mission as commanded manually by operation of control panel 104. For example, an adjustment value identifying a particular airport runway to be used for landing may be input to control panel 104, obtained by get adjustment values 208, and applied to enable particular working values of airport data from a set of built-in airport data. Similarly, if working values are initially provided on the assumption that all aircraft systems and flight crew capabilities are normal, more conservative working values may be implemented by suitable adjustment values in response to degradation or failure of particular aircraft systems (e.g., engines, instruments, radar, or communication equipment), in response to additional safety margin desired by particular owners or operators, in response to changes in flight crew (e.g., experienced pilot defers to less experienced co-pilot, use of auto-pilot, or hijacking), or in response to changes in mission or environment (e.g., increased traffic density, or poor visibility). A return to normal operation may be facilitated as desired.

Determine position and trends process 216, in any conventional manner, receives input data 214 (e.g., 101), performs any one or more of source selection (e.g., altitude as reported by radio altimeter 136 preferred over altitude determined by inertial reference system 132), filtering, interpolation, extrapolation, conversion (e.g., into engineering units required by predict threats process 222), and normalization as desired for particular measured (or reported) values received as input data to determine a present position of the aircraft and information (e.g., a trend in altitude) from which the position of the aircraft in the future may be predicted. In an alternate implementation, determine position and trends process 216 may provide current position and any number of future positions at particular times into the future and thereby omit providing trend data to predict threats process 222. Process 216 provides position and/or trend results 218 to process 222 and position and/or trend results to generate presentations process 226. Process 216 may further determine and report (218, 220) a situation or mode of the mission, for example, the five modes defined in TSO-C151a.

Predict threats process 222, generate audio process 224, and generate presentations process 226, in any conventional manner, predict threats based on working values 212 and position and/or trend data 218, and cooperate to provide advice and conventional status as discussed above.

Figure 3:
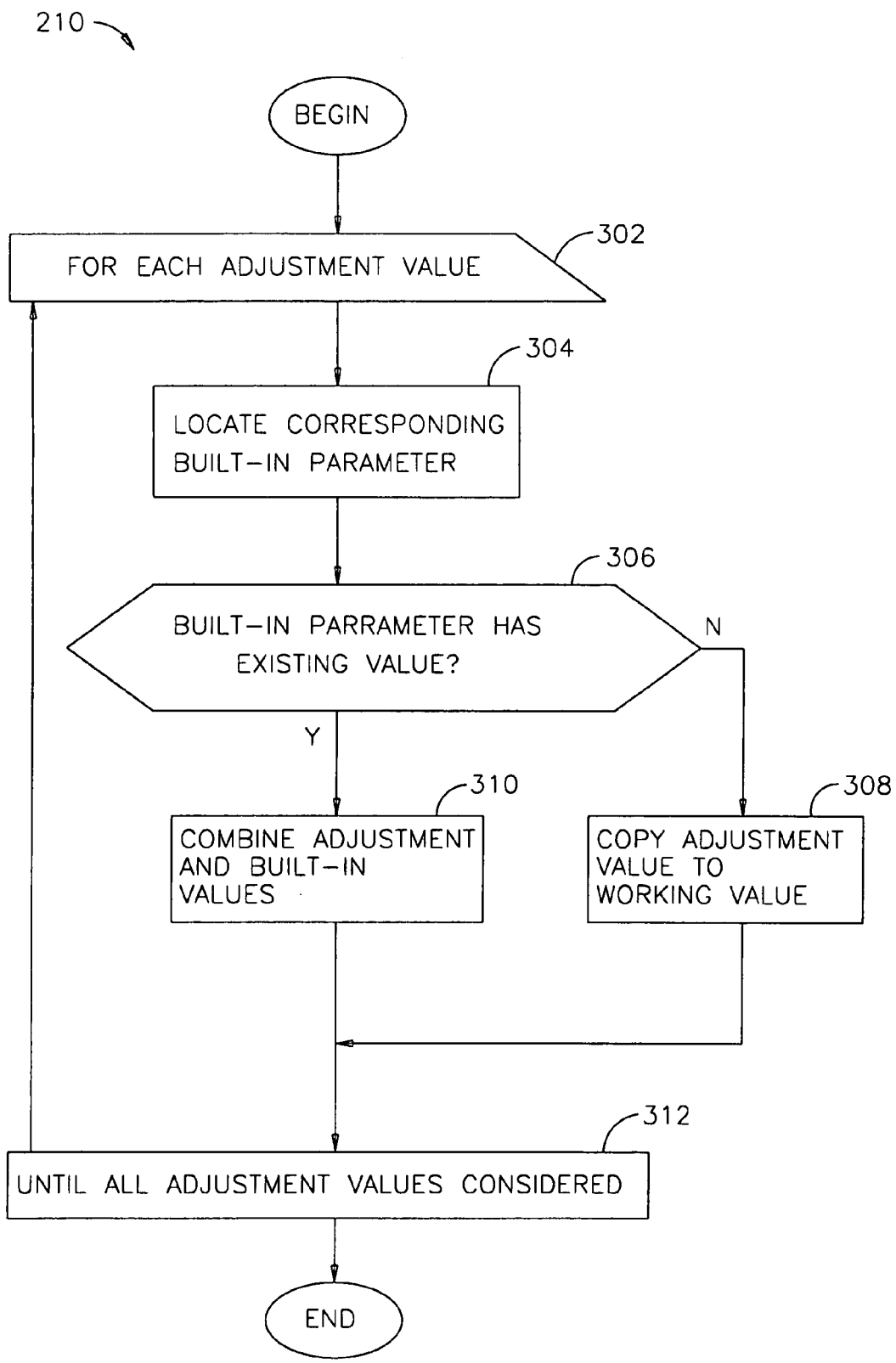
FIG. 3 is a process flow diagram of the process for applying adjustments of FIG. 2.

In one implementation of process 210, several adjustment values are processed in series to effect any hierarchical relationship that may exist among the adjustment values. For example, process 210 may include method 210 of FIG. 3. For each particular adjustment value received (302) from process 208, a corresponding built-in parameter is located (304). A location may be determined in any manner as discussed above, for example, by matching a symbolic reference (e.g., a label, an object reference, or an address) associated by process 208 with the particular adjustment value to a reference (e.g., via a list or symbol table) to a particular working value 212 as stored in memory 108. It is then determined (306) whether the built-in parameter has an existing value. If the corresponding built-in parameter has no value, the adjustment value is copied (308) to the working value for the particular parameter. Otherwise, the adjustment value is applied (310) to the existing value (e.g., a base value, or an intermediate value) as discussed above. In either event, after copying or applying the adjustment value, it is determined whether all adjustment values have been considered (312). If so, the method of FIG. 3 is complete; and otherwise, control loops to obtain the next adjustment value (302).

The systems and methods discussed above may be applied to any application program executed by a threat avoidance processor. Application program functions may include surveillance, instrument monitoring, data capture, control, data processing, computation, analysis, graphics, reporting, advising, database management, and network communications.

Different acceptable levels of equipment and personnel safety may be achieved by application programs of system 100 (400) with different components read from portable memory or selected (e.g., enabled) from installed environment memory according to data read from portable memory. For example, in a first scenario the aircraft hosting system 100 (400) is used for commercial passenger transportation and may include components implementing relatively low working values (e.g., base value reduced by an adjustment factor) for climb angle, available thrust, and relatively large values (e.g., base value increased by an adjustment factor) for turn radius so that advice is based on projections allowing time and distance for performing relatively gentle maneuvers consistent with relatively specialized pilot training (e.g., little variation in flight plans). Use of the same aircraft hosting system 100 (400) in a second scenario for touring aircraft or military aircraft may include components implementing relatively higher working values for climb angle, available thrust, and turn radius that may be consistent with relatively comprehensive training (e.g., many different flight plans).

The same aircraft type may be deployed in service to several airlines. Each airline may manage flight safety differently. System 100 of configuration A on an aircraft for airline A may operate according to special components different from system 100 of configuration B on an aircraft for airline B having different special components. Systems 100-A and 100-B may operate according to the same base values and use different working values by virtue of adjustment values being applied.

In a method for deploying certified systems, each having a desirable absence of nuisance advisories, working values for flight models and advice criteria may be specified in accordance with system engineering data of the system integrator (or subsystem manufacturer) and/or with government regulations so as to define a base value; and, customized for particular operating airlines, missions, pilots, and environmental conditions as discussed above so as to define a single level or a hierarchy of adjustment values. Working values may be certified in any conventional manner including by analysis; or by test suites of combinations or extremes of particular working values.

In an implementation of a threat avoidance system according to various aspects of the present invention, flight safety system configuration, aircraft capability, flight crew capability, and mission (e.g., flight plan types) may be implemented in flight models and advice criteria as base and adjustment values for one or more of the parameters defined in Table 1.

TABLE 1

| Parameters | Description |
| --- | --- |
| Flight safety system configuration | Identification of what subsystems (and versions) are coupled to cooperate for threat avoidance on this particular host aircraft. |
| Aircraft capability | A suitable parametric description of the expected capabilities of any or all of one or an expected variety of aircraft (e.g., extremes, averages, or cataloged), for example, any of: climb angle to avoid threat, thrust capability to avoid threat, bank angle to avoid threat, instrument accuracy, aircraft response time. |
| Flight crew capability | A suitable parametric description of the expected capabilities of any or all of one or an expected variety of flight crews (e.g., extremes, averages, or cataloged), for example, any of: response time, visibility, training, experience, and temperament. Any parameter may be implemented as an array of values for different situations, for example, pilot response time in a turn, pilot response time in level flight, pilot response time while descending. The array may have multiple dimensions for different advice, for example, pilot response time in a turn under a caution advice, pilot response time in level flight under a warning advice. |
| Mission | A suitable parametric description of the expected mission or variety of missions (e.g., extremes, averages, or cataloged), for example, any of: times of day, directions of travel, weather conditions, and approaches in mountainous regions, identities of formation members (e.g., Mode S Addresses, Flight IDs, Mode A Identity Codes, or IFF Mode 1 or 2 Identity Codes). In an alternate implementation, flight crew capability and mission may be cross referenced to describe a flight crew in different mission environments. |

In an implementation of a windshear threat avoidance processor, all parameters of Table 1 may be used in conjunction with windshear hazard detection techniques, advice criteria, and avoidance strategy parameters of Table 2.

TABLE 2

| Parameters | Description |
| --- | --- |
| Detection techniques | A suitable parametric description of the measurements made and logic used to determine whether one or more types of hazards represent a threat, respective location, and respective behavior (e.g., movement). |
| Advice criteria | A suitable parametric description of forms and circumstances for providing audible and/or visual advice. For example, various magnitudes of proximity to a hazard (in distance or flight time) may be the basis for warnings, cautions, and status relating to relative safety (e.g., do not bank to port, or now clear of hazard). |
| Avoidance strategies | A suitable parametric description of one or more strategies assumed to be available to reduce the threat. For systems that provide resolution advice, different advice may be provided according to different strategies (e.g., only vertical maneuvers, or only horizontal maneuvers, or both vertical and horizontal maneuvers). |

Advice criteria as in Table 2 above or in any of the tables below may be supplemented as follows. Parameters may describe assumed capabilities for reducing the threat (e.g., avoiding the hazard) to be used to determine a type of advice to provide (e.g., percent of maximum climb angle for avoiding a caution advice, percent of maximum bank angle, percent of maximum thrust for avoiding a warning advice).

Parameters may describe selection and timing of advice (e.g., whether or when to provide during a warning advice an additional caution advice regarding a different hazard). An array of advice criteria may be used to describe advice criteria for a variety of aircraft, flight crew types, and mission types.

In an implementation of a controlled flight into terrain (CFIT) threat avoidance processor, all parameters of Table I may be used in conjunction with terrain hazard detection techniques, advice criteria, and avoidance strategy parameters of Table 3.

TABLE 3

| Parameters | Description |
| --- | --- |
| Detection techniques | A suitable parametric description of the measurements made and logic used to determine whether a CFIT hazard represents a threat and its location relative to the host aircraft. |
| Advice criteria | A suitable parametric description of forms and circumstances for providing audible and/or visual advice. For example, any conventional parameters may be described, such as, flight path angle, minimum terrain clearance distance, terrain look-ahead (flight time or distance) for |

TABLE 3-continued

| Parameters | Description |
|---|---|
| | caution advice, and terrain look-ahead for warning advice. Terrain look-ahead (time or distance) may be defined by an array for different values as a function of distance and bearing (or time) from the host aircraft in any conventional manner. |
| Avoidance strategies | A suitable parametric description of a threat detection sensor. A set of threat detection sensors may be provided for selection in accordance with operator (e.g., one of several airlines), aircraft capability, flight crew capability, and mission. Some or all values describing a selected sensor may be transferred to working memory as discussed above; or a predefined set of values describing a sensor may be enabled for use according to a working value. |

A terrain detection technique according to various aspects of the present invention, includes a sensor selected or defined at least in part in accordance with an adjustment value. For example, a CFIT threat avoidance system having a threat avoidance processor may implement a threat avoidance strategy based on a model of terrain and a sensor projected generally in front of the aircraft. The sensor includes a set of criteria that may be understood as a set of lines or planes for projection onto the model of terrain. Each line or plane comprises a locus of points, wherein each point is a condition by which a threat is determined to exist or not. If any point of a sensor lies on or within the model of terrain, then a threat exists (e.g., threat of CFIT).

Figure 5:
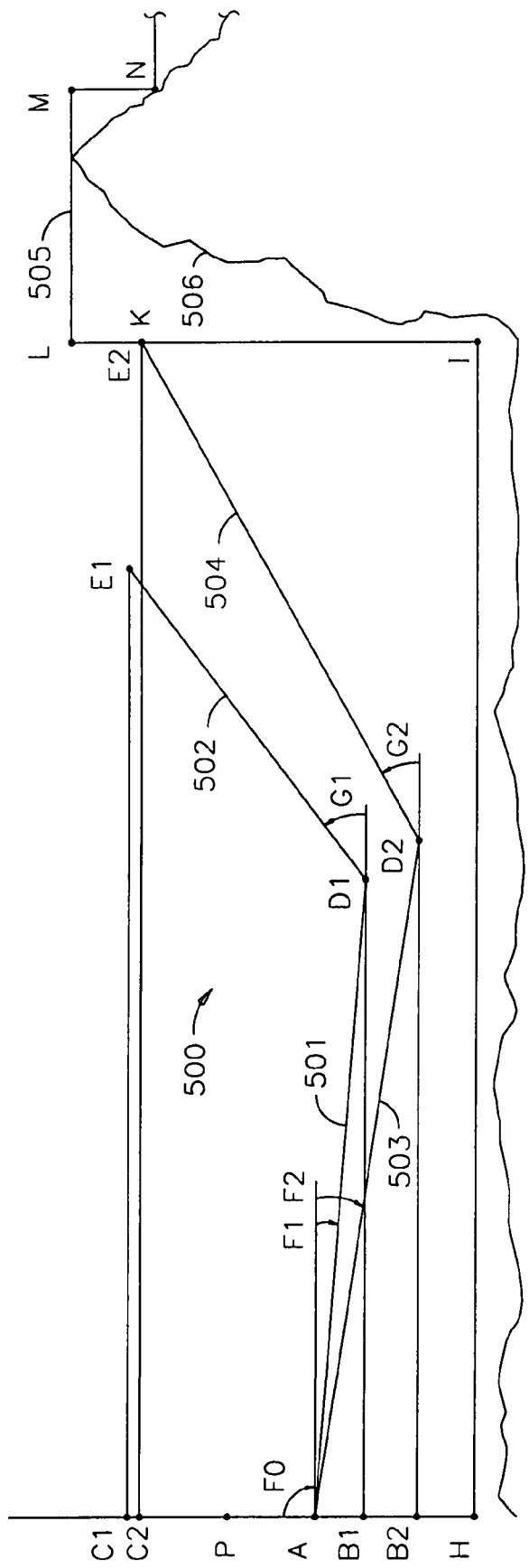
FIG. 5 is a diagram of several profiles according to various aspects of the present invention for assessing the risk of collision with terrain.

For example, a set of sensors 500 of FIG. 5, includes sensors 501-502 and 503-504 projected generally in front of an aircraft at point P. The aircraft at point P is presented for simplicity in horizontal flight with an actual flight path angle of 0 degrees from horizontal or 90 degrees from vertical as illustrated at point A by angle F0. FIG. 5 presents a cross section on a vertical plane to indicate elevation (y-axis) as a function of distance (or flight time) (x-axis). Sensors 500 are projected at an altitude above terrain 506 and above the model of terrain 505. Terrain is modeled as a set of horizontal and vertical segments between points H, I, L, M, and N. Sensor 501-502 includes segment AD1 501 at flight path angle F1 and segment D1E1 502. Sensor 503-504 includes segment AD2 503 at flight path angle F2 and segment D2E2 504. With the same aircraft, flight crew, and mission, sensor 503-504 provides a greater measure of safety than sensor 501-502 because, a CFIT threat is detected by use of sensor 503-504 (e.g., point K) at the instant portrayed in FIG. 5, whereas a CFIT threat is not yet detected by use of sensor 501-502.

Parameters that may be use to define a sensor as discussed above are described in Table 4 with reference to sensors 501-502 and 503-504. A terrain avoidance system according to various aspects of the present invention may use one sensor (e.g., 501-502), the shape of which typically varies dynamically with the aircraft situation. Adjustment values alone or in combination with built-in values may provide a default shape. Adjustment values may modify a built-in sensor (e.g., 501-502) to a more conservative working sensor (e.g., 503-504). Adjustment values may modify a built-in sensor (e.g., 503-504) to a less conservative working sensor (e.g., 501-502). In another implementation, two sensors are used, one for caution alerts and one for warning alerts. The parameters in Table 4 describe a sensor, for example, a built-in sensor or adjustments to be made to a built-in sensor. Adjustment values may replace built-in values, be used to select among several built-in values, or may be combined with built-in or default values (e.g., as an offset: by addition or subtraction, or as a factor: by multiplication or division). A default value includes any value considered part of an installed system (e.g., part of a standard upload) prior to obtaining, receiving, and/or applying adjustments.

TABLE 4

| Parameters | Description |
|---|---|
| Minimum terrain clearance distance | A minimum distance to terrain below the aircraft, for example, corresponding to segment PA (e.g., 500 ft.) A replacement value, an offset, or factor may be used to provide the minimum terrain clearance distance of a working sensor, for example, to a more conservative value (e.g., 600 ft.) |
| Sensor flight path angle | Sensor flight path angle is illustrated as F1 (e.g., −10 degrees) for sensor 501-502 and as angle F2 (e.g., −15 degrees) for sensor 503-504. In FIG. 5 the aircraft at point P is in level flight with actual flight path angle equal to 0 degrees. Actual flight path angle is calculated as the arctangent of the ratio of vertical speed and horizontal speed. Sensor flight path angle directs the sensor at a more conservative angle than actual flight path angle to account for sources of error and provide for increased flight safety. A replacement value, an offset, or factor may be used to provide the sensor flight path angle of a working sensor. For example, an offset of −5 degrees may combine with a built-in value of −10 degrees to provide a −15 degree sensor flight path angle. |
| Crew response time allowance | A time (or distance) for a pilot or other crew member to respond to an alert, for example, the length of segment B1D1 (20 seconds) for sensor 501-502 and segment B2D2 (24 seconds) for sensor 503-504. A replacement value, an offset, or factor may be used to provide a response time for a working sensor. A built-in sensor may be adjusted to provide a sensor tailored to a particular crew to account for particular |

TABLE 4-continued

| Parameters | Description |
| --- | --- |
| | training, experience, and present ability. |
| Climb gradient | The aircraft in an escape maneuver is expected to be able to climb at or steeper than a specified climb gradient -- typically a default (in the absence of adjustment) or built-in value. |
| Climb gradient adjustment | In FIG. 5, angle G1 (e.g., 7 degrees) for sensor 501-502 and angle G2 (e.g., 6.5 degrees) for sensor 503-504 represent working values of climb gradient. A working value of climb gradient may result from combining or selecting in accordance with an adjustment. A climb gradient factor may be a value in a range from 80% to 95% (e.g., 88%). Angle G1 may result from applying a climb gradient factor (e.g., 88%) to a built-in or uploaded climb gradient. |
| Terrain look ahead time | A time (or distance) believed to be sufficient for escaping a threat. For example, a time (distance) corresponding to segment C1E1 (e.g., 120 seconds) for sensor 501-502 and corresponding to segment C2E2 (132 seconds) for sensor 503-504. |

In an implementation of a traffic collision threat avoidance processor, all parameters of Table 1 may be used in conjunction with traffic collision hazard detection techniques, advice criteria, and avoidance strategy parameters of Table 5. In other words, a traffic collision avoidance processor (e.g., one or more modules that perform a traffic collision avoidance algorithm) may refer to working values of parameters that are determined with reference to an adjustment value as discussed above.

TABLE 5

| Parameters | Description |
| --- | --- |
| Detection techniques | A suitable parametric description of the measurements made and logic used to determine whether the hazard of collision with another aircraft represents a threat to the host aircraft and possible locations of impact relative to the host aircraft. Parameters may be used to customize detection, communication between aircraft, communication with ground based systems, and tracking algorithms. Parameters may be used to customize functions of process 216 including, for example, custom thresholds for accepting/rejecting input data (own or other altitude input changing faster than allowable range specified in own aircraft capabilities or presumed for other aircraft), and custom acceptance criteria for formation member data (e.g., whether or not the data are from or describe a formation member as defined in the mission parameters of Table 1). |
| Advice criteria | A suitable parametric description of forms and circumstances for providing audible and/or visual advice. For example, any conventional parameters may be described such as, tau for caution advisory, tau for warning advisory, encroachment criteria for member aircraft flying in a formation, encroachment criteria for nonmember aircraft used when the host aircraft is flying in a formation. Further, encroachment criteria for member aircraft flying in a formation may be customized for one or more of a variety of formations (e.g., differing desired separations). |
| Avoidance strategies | A suitable parametric description of caution and warning zones surrounding the aircraft may operate in accordance with working values as discussed above in Table 3. |

In an implementation of an adverse weather avoidance processor, all parameters of Table 1 may be used in conjunction with adverse weather hazard detection techniques, advice criteria, and avoidance strategy parameters analogous to those described in Table 3. In other words, an adverse weather avoidance processor (e.g., one or more modules that perform an adverse weather avoidance algorithm) may refer to working values of parameters that are determined with reference to an adjustment value as discussed above.

The foregoing description discusses preferred embodiments of the present invention which may be changed or modified without departing from the scope of the present invention as defined in the claims. While for the sake of clarity of description, several specific embodiments of the invention have been described, the scope of the invention is intended to be measured by the claims as set forth below.

What is claimed is:

1. A system installed on a host aircraft for enhancing flight safety of the host aircraft, the system comprising:
 a. means for receiving an adjustment value from a portable memory device;
 b. means for determining a working value of a parameter in accordance with a combination of the adjustment value and an existing value of the parameter, the parameter describing other than terrain and expected climb gradient; and
 c. means for threat avoidance that provides an advice in accordance with the working value of the parameter.

2. The system of claim 1 wherein the means for receiving comprises a PCMCIA interface for operation with the portable memory device.

3. The system of claim 1 wherein the combination comprises at least one of addition and subtraction.

4. The system of claim 1 wherein the combination comprises at least one of multiplication and division.

5. The system of claim 1 wherein the parameter describes a flight crew capability.

6. The system of claim 1 wherein the parameter describes a mission of the host aircraft.

7. The system of claim 1 wherein the means for threat avoidance comprises means for performing a threat detection technique in accordance with a threat detection technique parameter that comprises the working value of the parameter.

8. The system of claim 1 wherein the means for threat avoidance provides the advice in accordance with a threat advice parameter comprising the working value of the parameter.

9. The system of claim 1 wherein the means for threat avoidance comprises a threat avoidance parameter comprising the working value of the parameter.

10. A system installed on a host aircraft for enhancing flight safety of the host aircraft, the system comprising:
   a. means for receiving an adjustment value from a portable memory device;
   b. means for selecting a working value of a parameter from a set of existing values, selecting being in accordance with the adjustment value, the parameter describing other than terrain and expected climb gradient; and
   c. means for threat avoidance that provides an advice in accordance with the working value of the parameter.

11. A method for enhancing flight safety of an aircraft, the method comprising:
   a. a step for receiving an adjustment value from a portable memory device;
   b. a step for determining a working value of a parameter in accordance with a combination of the adjustment value and an existing value of the parameter, the parameter describing other than terrain and expected climb gradient; and
   c. a step providing an advice for threat avoidance in accordance with the working value of the parameter.

12. The method of claim 11 wherein the step for receiving comprises a receiving via a PCMCIA interface in operation with the portable memory device.

13. The method of claim 11 wherein the combination comprises at least one of addition and subtraction.

14. The method of claim 11 wherein the combination comprises at least one of multiplication and division.

15. The method of claim 11 wherein the parameter describes a flight crew capability.

16. The method of claim 11 wherein the parameter describes a mission of the host aircraft.

17. The method of claim 11 wherein the step for threat avoidance comprises step for performing a threat detection technique in accordance with a threat detection technique parameter that comprises the working value of the parameter.

18. The method of claim 11 wherein the step for threat avoidance provides the advice in accordance with a threat advice parameter comprising the working value of the parameter.

19. The method of claim 11 wherein providing an advice for threat avoidance is performed in accordance with a threat avoidance parameter comprising the working value of the parameter.

20. A system installed on a host aircraft for enhancing flight safety of the host aircraft, the system comprising:
   a. means for receiving an adjustment value from a portable memory device;
   b. means for determining a working value of a parameter in accordance with a combination of the adjustment value and an existing value of the parameter, the parameter describing other than expected climb gradient; and
   c. means for traffic collision avoidance that provides an advice in accordance with the working value of the parameter.

21. A method for enhancing flight safety of an aircraft, the method comprising:
   a. a step for receiving an adjustment value from a portable memory device;
   b. a step for selecting a working value of a parameter from a set of existing values, selecting being in accordance with the adjustment value, the parameter describing other than terrain and expected climb gradient; and
   c. a step for providing an advice for threat avoidance, the advice in accordance with the working value of the parameter.

* * * * *